United States Patent [19]

Mason et al.

[11] Patent Number: 5,461,120
[45] Date of Patent: Oct. 24, 1995

[54] TRANSPARENT THERMOPLASTIC MOLDING COMPOSITIONS

[75] Inventors: James P. Mason, McKees Rocks; Robert A. Pyles, Bethel Park, both of Pa.

[73] Assignee: Bayer Corporation, Pittsburgh, Pa.

[21] Appl. No.: 245,334

[22] Filed: May 18, 1994

[51] Int. Cl.$^6$ .................................. C08F 283/02
[52] U.S. Cl. .................. 525/462; 528/176; 528/196; 528/198
[58] Field of Search .................. 528/176, 196, 528/198; 525/462

[56] References Cited

U.S. PATENT DOCUMENTS

| | | | |
|---|---|---|---|
| 5,010,146 | 4/1991 | Kohsaka et al. | 525/439 |
| 5,104,723 | 4/1992 | Freitag et al. | 428/220 |
| 5,132,154 | 7/1992 | Westeppe et al. | 428/65 |

Primary Examiner—James J. Seidleck
Assistant Examiner—Terressa Mosley
Attorney, Agent, or Firm—Joseph C. Gil; Aron Preis

[57] ABSTRACT

A thermoplastic molding composition which has an improved total light transmission value comprising (i) copolyester of ethylene terephthalate and cyclohexane dimethanol and (ii) at least one member selected from the group consisting of (a) an aromatic copolycarbonate resin which contains at least some structural units derived from a dihydroxy compound having a special cyclic bridging units and (b) a blend containing (b1) and (b2) wherein
(b1) is an aromatic polycarbonate resin which is derived from dihydroxy compounds having no special cyclic bridging units and where
(b2) is said (a), is disclosed. The special cyclic bridging unit corresponds to

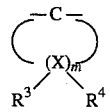

wherein $R^3$ and $R^4$, X and m are defined.

8 Claims, No Drawings

TRANSPARENT THERMOPLASTIC MOLDING COMPOSITIONS

FIELD OF THE INVENTION

The invention relates to thermoplastic molding compositions and more particularly to compositions containing a copolyester of ethylene terephthalate and cyclohexane dimethanol.

SUMMARY OF THE INVENTION

A thermoplastic molding composition which has an improved total light transmission value is disclosed. The composition comprise (i) copolyester of ethylene terephthalate and cyclohexane dimethanol and (ii) at least one member selected from the group consisting of (a) an aromatic copolycarbonate resin which contains at least some structural units derived from a dihydroxy compound having a special cyclic bridging units and (b) a blend containing (b1) and (b2) wherein (b1) is an aromatic polycarbonate resin which is derived from dihydroxy compounds having no special cyclic bridging units and where (b2) is said (a).

The special cyclic bridging unit corresponds to

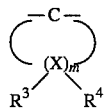

wherein $R^3$ and $R^4$, X and m are defined.

An additional embodiment of the invention concerns a method for improving the TLT value of a composition containing the copolyester and said b1. The method comprise replacing at least some of said b1 by said b2.

BACKGROUND OF THE INVENTION

Thermoplastic molding compositions containing polyesters and polycarbonate resins are being used in a wide variety of applications because of their attractive profile of mechanical and physical properties. A key property for many applications is the transparency of the composition. A commercial product containing a blend of terephthalate of ethylene glycol and cyclohexane dimethanol and polycarbonate is noted for its transparency.

The relevant art is noted to include U.S. Pat. No. 5,104,723 which disclosed blends of PET with PC2 polycarbonate resins. Also relevant is U.S. Pat. No. 5,132,154 which disclosed blends of PC2 with conventional PC1 resins. Our patent application—Ser. No. 08/093,834 filed Jul. 19, 1993—relates to a transparent composition containing polyethylene terephthalate, PC1 and PC2.

It is an object of the present invention to provide thermoplastic compositions containing a copolyester of ethylene terephthalate and cyclohexane dimethanol resin (herein PETG) and polycarbonate resins which exhibit good TLT values.

It is a further object of the present invention to provide a method for making thermoplastic compositions containing a copolyester of ethylene terephthalate and cyclohexane dimethanol and polycarbonate resins which compositions exhibit improved TLT values.

DETAILED DESCRIPTION OF THE INVENTION

Accordingly disclosed is a thermoplastic molding composition has an improved total light transmission value comprising (i) copolyester of ethylene terephthalate and cyclohexane dimethanol (herein PETG) and (ii) at least one member selected from the group consisting of (a) an aromatic copolycarbonate resin which contains at least some structural units derived from a dihydroxy compound having a special cyclic bridging units and (b) a blend containing (b1) and (b2) wherein (b1) is an aromatic polycarbonate resin which is derived from dihydroxy compounds having no special cyclic bridging units and where (b2) is said (a).

Preferably the composition contains (i) about 1 to 99 percent of said PETG and (ii) about 99 to 1 percent at least one member selected from the group consisting of said (a) and (b).

Most preferably the composition of the invention contains PETG in an amount of 15 to 60% by weight, said first aromatic polycarbonate in an amount of about 20 to 65% by weight, the balance to 100 weight percent being said second aromatic polycarbonate.

In the present context, resin (b1) above will be referred to occasionally as PC1 or "first aromatic polycarbonate" and resin (b2) will be occasionally referred to as PC2 or "second aromatic polycarbonate".

The second aromatic polycarbonate resin (PC2) differs from said first aromatic polycarbonate (PC1) in that it contains at least some structural units derived from a dihydroxy compound having a special bridging unit corresponding to

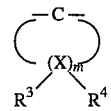

wherein $R^3$ and $R^4$ independently one of the other represent a hydrogen atom or a $C_{1-6}$ alkyl and X denotes carbon, with the proviso that $R^3$ and $R^4$ both represent an alkyl radical on at least one of the X carbon atoms, and where m is an integer of 4 to 10. Preferably, the second aromatic polycarbonate resin contains about 10 to 100 mole percent, most preferably about 30 to 80 mole % of said special units. The thermoplastic molding compositions of the invention contains (i) about 1 to 99 percent PETG and (ii) about 0 to 98 percent of PC1 and (iii) about 1 to 99 percent of PC2.

The invention also relates to a method for increasing the TLT values of a thermoplastic molding composition which contains as resinous components only (i) PETG and (ii) said first aromatic polycarbonate resin. Accordingly, the TLT of such composition is increased by adding thereto an amount of said PC2, said amount being sufficient to increase the TLT value of the composition. The TLT value of the composition being determined in accordance with ASTM D-1003 using specimens 0.100" in thickness. The improvement in TLT value being represented by an increase over the value exhibited by a composition which contains solely the corresponding amount of PETG and said b1.

The PETG useful in the present context is a well know thermoplastic resin which is available in commerce. It is characterized in that it contains a positive amount, less than 50 mole percent of structural units derived from cyclohexanedimethanol the balance of the structural units being derived from ethylene glycol. The acidic component of this copolyester is derived from terephthalic acid. More preferably, the cyclohexanedimethanol content is about 20 to 30 mole percent. A suitable PETG resin, Eastman's Kodar PETG 6763 resin, is characterized in that it has a number average molecular weight of about 26,000 and a glass transition temperature of 81° C.

The PETG of the invention includes branched resins the methods for their preparation by incorporating trihydric or tetrahydric alcohols or tribasic or tetrabasic acids are known in the art. Chain terminators suitable in the preparation of such polyesters are also well known in the art.

Methods for the preparation of suitable polyester resin are known and have been described in U.S. Pat. Nos. 2,463,319 and 3,047,539 which are incorporated herein by reference.

The first polycarbonate resin (PC1) is derived from at least one dihydroxy compound conforming to formula (1) or (2)

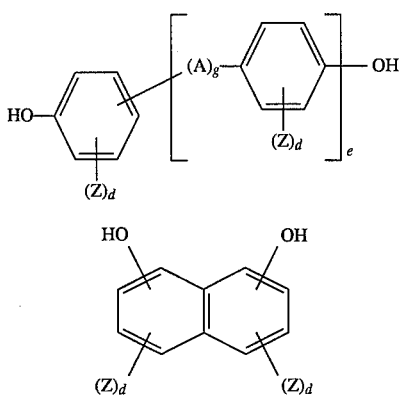

wherein A denotes an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a carbonyl group, an oxygen atom, —S—, —SO— or —SO$_2$— radical or a radical conforming to

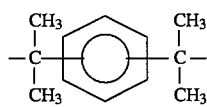

and wherein g denotes 0 or 1, e denotes 0 or 1, d denotes 0 to 4 and f denotes 0 to 3, and where the several Z substituents independently one of the other denotes F, Cl, Br or an alkyl group having 1 to 4 carbon atoms with the proviso that dihydroxydiphenyl cyclohexane conforming to formula (3) are excluded.

Among the useful dihydroxy compounds in the practice of the invention are hydroquinone, resorcinol, bis-(hydroxyphenyl)-alkanes, bis-(hydroxyphenyl)-cycloalkanes, bis-(hydroxyphenyl)-ethers, bis-(hydroxyphenyl)-ketones, bis-(hydroxyphenyl)-sulfoxides, bis-(hydroxyphenyl)-sulfones and 2,2-bis-(hydroxyphenyl)-diisopropyl-benzenes. These and further suitable aromatic dihydroxy compounds are described, for example in U.S. Pat. Nos. 3,028,365, 2,999,835, 3,148,172, 3,271,368, 2,991,273, 3,271,367, 3,280,078, 3,014,891 and 2,999,846 (all incorporated herein by reference), in German Offenlegungsschriften (German Published Specifications) Nos. 1,570,703, 2,063,050, 2,063,052, 2,211,956 and 2,211,957 in French Patent Specification No. 1,561,418 and in the monograph, H. Schnell, Chemistry and Physics of Polycarbonates, Interscience Publishers, New York, 1964. Further examples of suitable bisphenols are 2,2-bis-(4-hydroxy-phenyl)-propane (bisphenol A), 2,4-bis-(4-hydroxyphenyl)-2-methylbutane, 1,1-bis-( 4-hydroxyphenyl)-cyclohexane, 2,2-bis-(4-hydroxy-phenyl)-p-diisopropylbenzene, 2,2-bis(3-chloro-4-hydroxy-phenyl)-propane, hydroxybenzophenone and 4,4'-sulfonyl diphenol.

The most preferred bisphenol is 2,2-bis-(4-hydroxy-phenyl)-propane (bisphenol A).

The polycarbonates of the invention may entail in their structure, units derived from one or more of the suitable bisphenols.

The preparation of polycarbonate resins may be carried out in accordance with any of the processes known in the art, for example, by the interfacial polycondensation process polycondensation in a homogeneous phase or by transesterification.

The suitable processes and the associated reactants catalysts, solvents and conditions are known in the art and have been described, inter alia, in German Patent Nos. 1,046,311 and 962,274 and in U.S. Pat. Nos. 3,248,414; 3,153,008; 3,215,668; 3,187,065; 3,028,365; 2,999,846; 2,999,835; 2,964,974; 2,970,137; 3,912,638 and 1,991,273.

In the preparation of the polycarbonate resins of the invention, monofunctional reactants such as monophenols may be used in order to limit their respective molecular weights. Also, branching agents may be employed. Branching may be obtained by the incorporation of small amount, preferably of between about 0.05 and 2.0 mol percent (relative to diphenols employed), of trifunctional or more than trifunctional compounds, especially compounds having three or more phenolic hydroxyl groups. Polycarbonates of this type are described, for example, in German Offenlegungsschriften (German Published Specifications) Nos. 1,570,533; 1,595,762; 2,116,974 and 2,113,347, British Specification No. 1,079,821 and U.S. Pat. No. 3,544,514 (incorporated herein by reference).

Some examples of compounds with three or more than three phenolic hydroxyl groups which can be used are phloroglucinol, 4,6-dimethyl-2,4,6-tri-(4-hydroxyphenyl)-heptane, 2,4,6-trimethyl-2,4,6, tri-(4-hydroxyphenyl)-heptane, 1,4,5-tri-(4-hydroxyphenyl)-benzene, 1,1,1-tri( 4-hydroxy-phenyl)-ethane, tri-(4-hydroxyphenyl)-phenylmethane, 2,2-bis-[4,4-bis-(4-hydroxyphenyl)-cyclohexyl]-propane, 2,4-bis(4-hydroxyphenylisoproply)-phenol, 6-bis(2-hydroxy-5'-methylbenzyl)-4-methylphenol, 2-(4-hydroxyphenyl)-2-(2,4-dihydroxyphenyl)propane,hexa(4-( 4-hydroxyphenylisopropyl)-phenyl)orthoterephthalic acid ester, tetra-(4-hydroxyphenyl)-methane tetra-(4-(4-hydroxyphenylisopropyl)-phenoxy)-methane and 1,4-bis-( 4'-4"-dihydroxytriphenyl)-methyl)-benzene. Some of the other trifunctional compounds are 2,4-dihydroxy-benzoic acid, trimesic acid, dyanuric chloride and 3,3-bis-(4-hydroxyphenyl)-2-oxo-2,3-dihydroindole.

Among the resins suitable in the practice of the invention are included phenolphthalein based polycarbonate, copolycarbonates and terpolycarbonates such as are described in U.S. Pat. Nos. 3,036,036 and 4,210,741, both incorporated by reference therein.

The second aromatic polycarbonate resin (PC2) is derived from at least one dihydroxy compound conforming to formula (3)

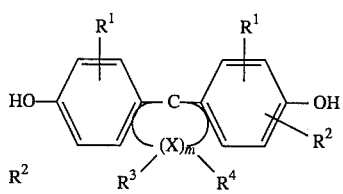

wherein $R^1$ and $R^2$ independently represent hydrogen, halogen, preferably chlorine or bromine, $C_{1-8}$ alkyl, $C_{5-6}$ cycloalkyl, $C_{6-10}$ aryl, preferably phenyl, and $C_{7-12}$ aralkyl, preferably phenyl-$C_{1-4}$ alkyl, in particular benzyl; m denotes an integer of 4 to 10, preferably 4–5; $R^3$ and $R^4$ independently one of the other represent a hydrogen atom or a $C_{1-6}$ alkyl and X denotes carbon, with the proviso that $R^3$ and $R^4$ both represent an alkyl radical on at least one of the X carbon atoms. Preferably both $R^3$ and $R^4$ represent alkyl on one or 2 X carbon atoms, most preferably only on one X carbon atom. Methyl is the preferred alkyl radical; the X atoms in the alpha position to the diphenyl substituted carbon atom (C-1) are preferably not dialkyl substituted; two alkyl substituents in the beta-position to C-1 is preferred.

Dihydroxydiphenylcyclohexanes having 5 or 6 ring carbon atoms in the cycloaliphatic radical (m represents 4 or 5 in general formula (I), for examples the diphenols:

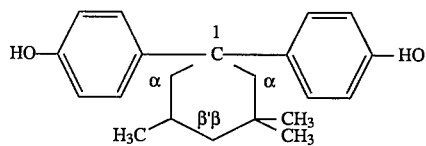

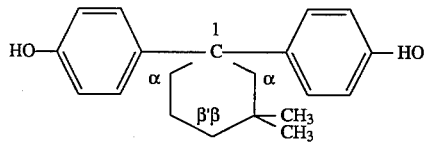

and

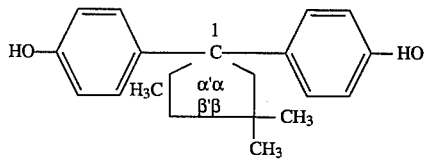

are preferred, 1,1-bis-(4-hydroxyphenyl)-3,3,5-trimethylcyclohexane (II) being particularly preferred.

The invention is further illustrated but is not intended to be limited by the following examples in which all parts and percentages are by weight unless otherwise specified.

EXAMPLES

Experimental

Compositions in accordance with the invention have been prepared and their properties evaluated. The preparation of the compositions in a twin screw extruder followed conventional procedures. Test specimens measuring 0.100" (thickness) were molded by injection following conventional procedures. TLT values were determined following the procedure described in ASTM D-1003 using a Match-Scan I Spectrophotometer (Diano Corporation). The following materials were used in preparing the compositions:

PETG: a copolyester of ethylene terephthalate and cyclohexane dimethanol having number average molecular weight of about 26,000-Kodar PETG 6763 resin from Eastman;

Polycarbonate (PC1): a homopolycarbonate based on bisphenol-A, a product of Miles Inc.

PC2: a copolycarbonate based on bisphenol A and containing 55 mole % of structural units conforming to

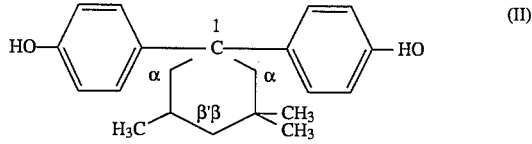

The table below summarized the results of the evaluations. The amount of each component is noted in percent relative to the weight of the composition.

| Composition | PETG | PC2 | PC1 | TLT |
|---|---|---|---|---|
| 1 | 00 | 50 | 50 | 89 |
| 2 | 20 | 15 | 65 | 79 |
| 3 | 20 | 25 | 55 | 80* |
| 4 | 20 | 40 | 40 | 84* |
| 5 | 20 | 60 | 20 | 85 |
| 6 | 20 | 80 | 0 | 83 |
| 7 | 40 | 0 | 60 | 50 |
| 8 | 40 | 30 | 30 | 74* |
| 9 | 40 | 60 | 0 | 84* |
| 10 | 60 | 0 | 40 | 51(i) |
| 11 | 60 | 20 | 20 | 73 |
| 12 | 60 | 40 | 0 | 68 |
| 13 | 100 | 0 | 0 | 84 |

*average value
(i)interpolated value

The results point to the surprising and unexpected improvement in terms of TLT which characterizes the compositions of the invention. The TLT value for PETG resin (84%) declines markedly upon the blending of polycarbonate (PC1) therewith (compare example 12 to example 7). It is indeed surprising and the art provides no guidelines in this regard that replacing at least part of PC1 with PC2 would not only recoup the losses in TLT but in fact would increase this value beyond that of PETG alone (example 5).

The TLT values of the inventive compositions are higher than the TLT value of a corresponding composition containing PETG and PC1 only (compare examples in the series 7, 8, 9 and the series represented in examples 10, 11 and 12).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition which has an improved total light transmission value comprising (i) copolyester of ethylene terephthalate and cyclohexane dimethanol and (ii) at least one member selected from the group consisting of (a) an aromatic copolycarbonate resin which contains at least some structural units derived from a dihydroxy compound having a special cyclic bridging units and (b) a blend containing (b1) and (b2) wherein (b1) is an aromatic polycarbonate resin which is derived from dihydroxy compounds having no special cyclic bridging units and where
(b2) is said (a),
said special cyclic bridging unit corresponding to

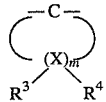

wherein $R^3$ and $R^4$ independently one of the other represent a hydrogen atom or a $C_{1-6}$ alkyl and X denotes carbon, with the proviso that $R^3$ and $R^4$ both represent an alkyl radical on at least one of the X carbon atoms, and where m is an integer of 4 to 10 said improved value represented by an increase over the value exhibited by a corresponding composition which contains solely said copolyester of ethylene terephthalate and cyclohexane dimethanol and said b1.

2. The composition of claim 1 wherein said (b1) is an aromatic polycarbonate resin derived from a dihydroxy compound conforming to formula (1) or (2)

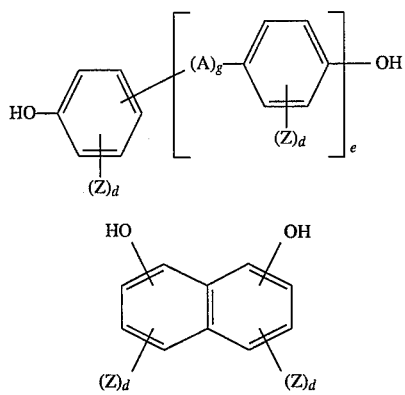

wherein A denotes an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a carbonyl group, an oxygen atom, —S—, —SO— or —$SO_2$— radical or a radical conforming to

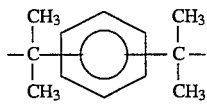

and wherein g denotes 0 or 1, e denotes 0 or 1, d denotes 0 to 4 and f denotes 0 to 3, and where the several Z substituents independently one of the other denotes F, Cl, Br or an alkyl group having 1 to 4 carbon atoms.

3. The composition of claim 1 wherein said a copolyester of ethylene terephthalate and cyclohexane dimethanol is present in an amount of 15 to 60% by weight and wherein the amount of said first aromatic polycarbonate is about 20 to 65% by weight and wherein the amount of said second aromatic polycarbonate is the balance to 100 weight percent.

4. A thermoplastic molding composition comprising
(i) copolyester of ethylene terephthalate and cyclohexane dimethanol
(ii) a first aromatic polycarbonate resin, and
(iii) a second aromatic polycarbonate resin which differs from said first in that it contains at least some structural units derived from a dihydroxy compound having a bridging unit corresponding to

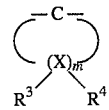

wherein $R^3$ and $R^4$ independently one of the other represent a hydrogen atom or a $C_{1-6}$ alkyl and X denotes carbon, with the proviso that $R^3$ and $R^4$ both represent an alkyl radical on at least one of the X carbon atoms, and where m is an integer of 4 to 7, said composition characterized in having a total light transmission (TLT) value which is greater than that of a composition containing only the corresponding amount of said copolyester and said first aromatic polycarbonate resin, said TLT being measured in accordance with ASTM D-1003 on test specimens having a thickness of 0.100.

5. A thermoplastic molding composition comprising
(i) copolyester of ethylene terephthalate and cyclohexane dimethanol and
(ii) a (co)polycarbonate resin which contains about 10 to 100 mole percent structural units derived from a dihydroxy compound conforming to a member selected from the group consisting of

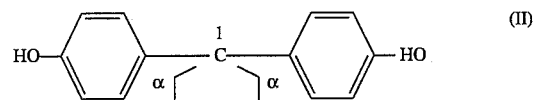

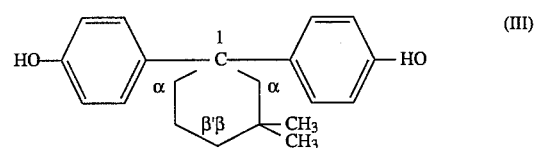

and

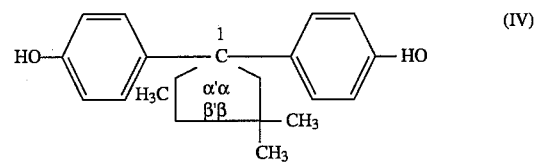

said percent being relative to the total molar amount of dihydroxy compounds from which said (co)polycarbonate is derived.

6. A thermoplastic molding composition comprising
(i) copolyester of ethylene terephthalate and cyclohexane dimethanol and
(ii) a copolycarbonate resin which contains about 30 to 80 mole percent structural units derived from a dihydroxy compound conforming to a member selected from the group consisting of

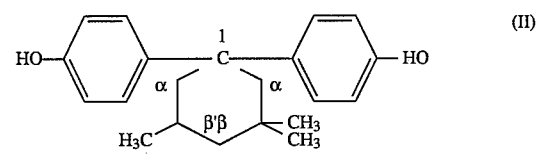

-continued

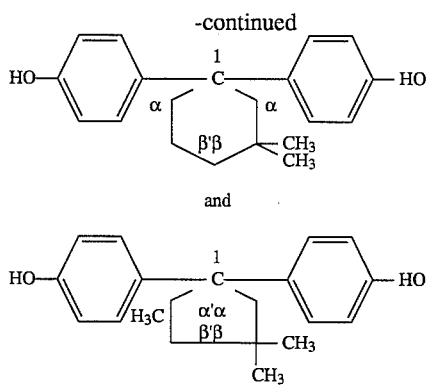

(III)

and (IV)

said percent being relative to the total molar amount of dihydroxy compounds from which said (co)polycarbonate is derived.

7. A thermoplastic molding composition comprising
   (i) copolyester of ethylene terephthalate and cyclohexane dimethanol and
   (ii) a copolycarbonate based on bisphenol A and containing about 30 to 80 mole % of structural units derived from 1,1-bis-(4-hydroxyphenyl)-3,3,5-trimethylcyclohexane said percent being relative to the total molar amount of dihydroxy compounds from which said (co)polycarbonate is derived.

8. The thermoplastic molding composition of claim 7 wherein said (i) is present in an amount of 15 to 60 percent by weight and said (ii) is present in an amount of 20 to 65 percent by weight, the balance to 100 weight percent being a (co)polycarbonate which is derived from dihydroxy compounds having no special cyclic bridging units.

* * * * *